Feb. 17, 1970  C. N. HAY  3,495,887

HIGH CAPACITY BEARING

Filed Sept. 11, 1968

INVENTOR.
Charles N. Hay
BY
F. J. Fosdale
ATTORNEY

United States Patent Office 3,495,887
Patented Feb. 17, 1970

3,495,887
HIGH CAPACITY BEARING
Charles N. Hay, Sandusky, Ohio, assignor to General Motors Corporation, Detroit, Mich., a corporation of Delaware
Filed Sept. 11, 1968, Ser. No. 759,062
Int. Cl. F16c *13/04, 19/06, 31/06*
U.S. Cl. 308—195         5 Claims

ABSTRACT OF THE DISCLOSURE

A Conrad bearing having less than a full complement of balls and no separator is disclosed. Resilient side plates mounted on the driven race are axially loaded into frictional engagement with the balls and accelerate them through the unloaded zone of the bearing to pile up in the loaded zone of the bearing thereby increasing its radial load capacity.

---

My invention relates generally to antifriction bearings and more specifically to a unit-handled antifriction bearing having races with deep groove raceways and uninterrupted shoulders used primarily to carry a fixed direction radial load.

In an antifriction bearing under radial load, only a small portion of the antifriction elements support the radial load at any instant. The load is shared by the antifriction elements in the load zone with the antifriction element directly under the load carrying the heaviest burden and the antifriction elements adjacent either side of it within the load zone carrying varying portions of the burden depending on their proximity to the load. The remainder of the antifriction elements are loosely contained between the races in the unloaded zone of the bearing and support no load. The antifriction elements are loosely contained in the unloaded zone of the bearing portion because of radial play or initial clearance built into the bearing and the increase of clearance caused by the compression of the antifriction elements and races in the load zone. Thus the radial load capacity of a bearing depends not so much on the number of antifriction elements in the bearing as it does on the number of antifriction elements in the load zone of the bearing at any given instant.

One way to assure that there is always a maximum number of antifriction elements in the load zone is to completely fill the annular space of the bearing between the races with antifriction elements. Such full complement bearings, however, are costly due to the number of antifriction elements required and a further requirement for loading grooves, split races, or other exotic provisions necessary for assembly of the bearing into a unit-handled relationship. Then too, in an antifriction full complement bearing, the antifriction elements because of their constant close proximity and rubbing generate frictional heat and increase bearing wear.

Accordingly, the object of my invention, stated in its broadest terms, is to provide an antifriction bearing having less than a full complement of antifriction elements with the bearing having an increased radial load carrying capacity by increasing the number of antifriction elements in the load zone at any given instant.

Another object of my invention is to provide such a bearing having a unit-handled relationship for ease of handling.

Structurally, my invention manifests itself by a simple mechanism which accelerates the antifriction elements through the unloaded zone of the bearing where they are loosely contained and causes them to pile up in the loaded zone of the bearing thereby providing a disproportionately large number of balls in the load zone at any given instant. This is accomplished by taking advantage of the fact that the rotating race in a bearing has a higher velocity than the antifriction elements in the load zone. Thus by causing the antifriction elements to follow the rotating race through the unloaded zone, the antifriction elements can be speeded through this zone and piled up in the loaded zone where they roll through it at a reduced speed and carry the load.

Thus another object of my invention is to provide an antifriction bearing having less than a full complement of antifriction elements and in which the antifriction elements are accelerated through the unloaded zone of the bearing to provide a disproportionately large number of antifriction elements in the load zone of the bearing and thereby increase its radial load capacity.

Another object is to provide such a bearing in a unit-handled relationship.

A very economical type of unit-handled bearing is the "Conrad" bearing which contains only the number of antifriction elements that can be assembled into a bearing having deep grooved races with uninterrupted shoulders by eccentrically locating the races and inserting the antifriction elements into the crescent-shaped space so formed. The number of antifriction elements that can be so assembled, however, is only enough to fill a little more than half the annulus when the races are concentrically located and the antifriction elements are circumferentially spaced by a separator. In such a bearing, the number of antifriction elements available in the load zone to support a radial load at any instant is relatively small.

As mentioned previously, it is the number of antifriction elements in the load zone rather than the number of antifriction elements per se which determines the radial load capacity. Accordingly, it is another object of my invention to increase the radial load capacity of a Conrad bearing by maintaining a disproportionately large number of balls in the load zone of the bearing.

Other objects and advantages of the invention will hereinafter become more fully apparent from the following description of the annexed drawings, which illustrate a preferred embodiment, and wherein.

Figure 1:
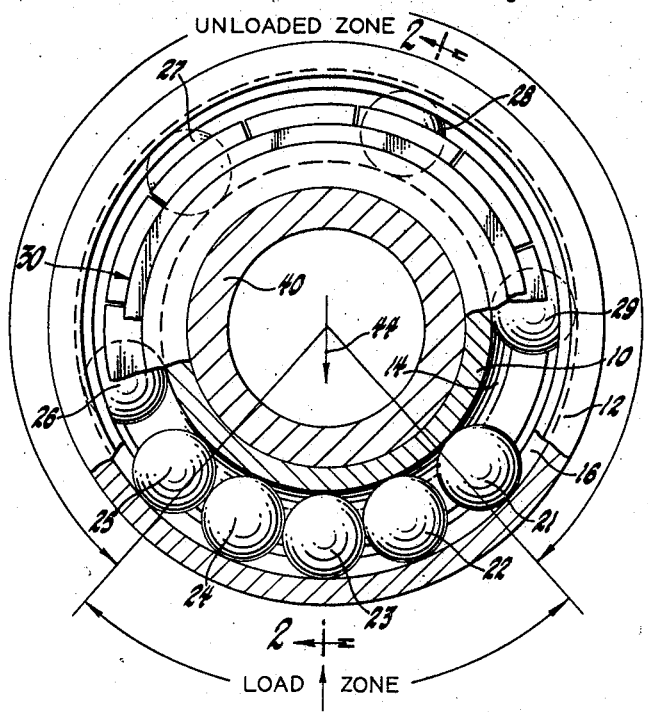
FIGURE 1 is a frontal view partially broken away for clarity of a bearing in accordance with my invention.
Figure 2:
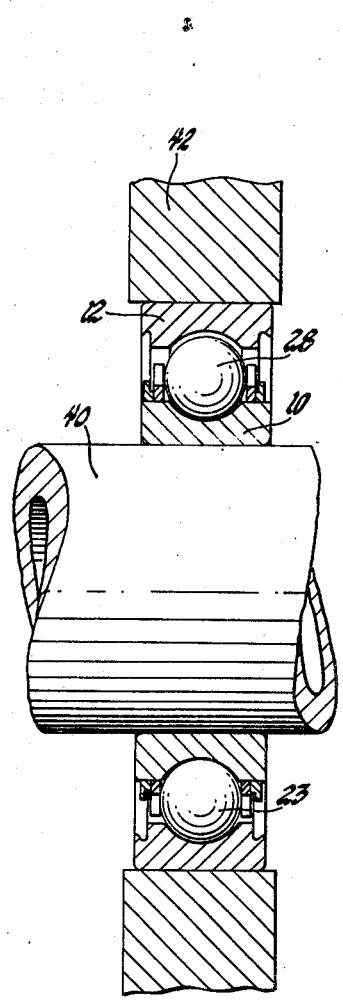
FIGURE 2 is a substantially vertical section taken along the line 2—2 of FIGURE 1 and showing the bearing of FIGURE 1 mounted in the bore of a supporting wall and rotatably supporting a shaft.
Figure 3:
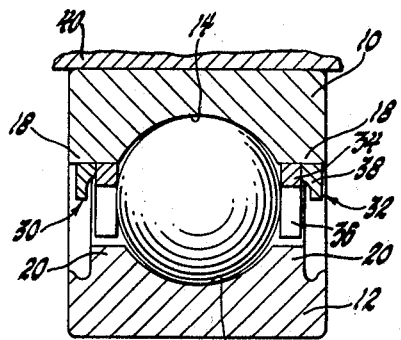
FIGURE 3 is an enlargement of a portion of FIGURE 2 showing the relationship of the side plates with a ball.
Figure 4:
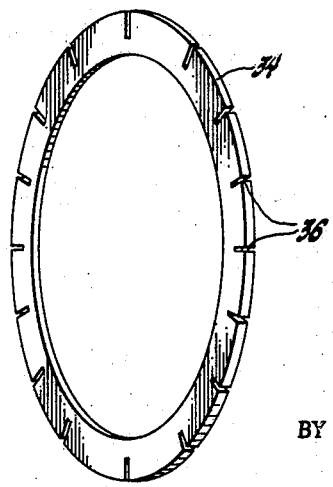
FIGURE 4 is a perspective view of one of the side plates.

Referring now to the drawings and more specifically to FIGURE 1, the particular bearing illustrated is a Conrad type ball bearing comprising an inner race 10 and an outer race 12 with deep groove raceways 14 and 16, respectively. Disposed between the races is a complement of balls. The particular bearing illustrated is a standard size bearing having a bore diameter of 1.5748 and an outer diameter of 3.1496. The races are of the deep groove type with uninterrupted shoulders 18 and 20 on the inner and outer races, respectively. The raceways and shoulders are so dimensioned so that when the bearing is assembled by the well known Conrad method, nine balls 21, 22, 23, 24, 25, 26, 27, 28, and 29 may be inserted into the crescent-shaped space formed by eccentrically nesting the inner race within the outer race. In the usual Conrad method, the races are subsequently concentrically located and a separator is added to the assembly to evenly circumferentially space the balls. In my invention, no separator is used but rather side plates 30 and 32 are assembled to one race after they are concentrically located as can be seen in FIGURES 2 and 3. Each side plate is identical so only one need be described. The side plate 32 comprises a resilient annulus 34 which is mounted on the outer diameter of shoulder 18 and is retained by a metal ring 38 which is pressed onto the shoulder outer diameter outboard of the annulus 34. The annulus 34 (FIGURE 4) must have sufficient resiliency to be spring-loaded axially into the balls to produce enough frictional force to cause the ball to follow the race 10 and accelerate through the unloaded zone of the bearing. While alternatives are possible, I have found that an annulus made of a reinforced phenolic resin with a number of circumferentially spaced open-ended slots 36 is suitable and that the drag caused by the resilient annulus is about the same as that produced by a seal. Another advantage of the slotted annulus is that it allows independent springing of each sector to accommodate small differences in ball diameter and/or lack of perfect flatness in the annulus. Side plates 32 and 34 are preferably provided on each side of the balls to provide equal and opposite axial friction-producing forces which tend to aid rather than oppose continued centering of the balls in the raceway.

The bearing is shown as rotatably supporting a shaft 40 in the bore of a supporting wall 42 in FIGURE 2. As is most often the case, the bearing supports a vertical load; the weight of the shaft, and whatever it carries. The clearance produced at the top of the bearing in the unloaded zone of the bearing is greatly exaggerated in FIGURE 2 for emphasis. This clearance depends in any given instance on the original radial play of the bearing as well as the radial load which the bearing carries.

In FIGURE 1, the load and unload zone of a typical bearing applied to carry a vertical load 44 is shown. The ball 23 is directly under the load and, of course, is carrying the greatest portion of the weight. The balls 22 and 24 adjacent it are in the load zone and sharing a portion of the load while the ball 25 is shown as about to exit the load zone and become unloaded. The ball 21 is about to enter the "pile up" of balls in the load zone and to share the weight of the shaft 40. The balls 26, 27, 28, and 29 are being accelerated through the unloaded zone of the bearing.

Another way to explain the functioning of my bearing is to take a stroboscopic approach and consider the balls 21 to 29 as positions of the same ball at different points in time. The ball enters the load zone 21 and rolls through it, experiencing a sinuous loading from 22 to a maximum at 23 and then decreasing at 24 and finally approaching zero at 25 where it is about to exit the loaded zone. At this point, the frictional engagement of the side plates is such that the ball follows the inner race and experiences a combination of rolling and skidding until it accelerates through positions 26, 27, 28, and 29 in the unloaded zone of the bearing and is again ready to enter the loaded zone of the bearing at position 21.

Thus it can be seen that I have provided a unit-handled antifriction bearing with its radial load capacity increased by maintaining a disproportionately large number of antifriction elements in the load zone of the bearing. Economical advantages are readily realized by utilization of a "Conrad" type bearing in which the separator is replaced with resilient side plates which have about the same manufacturing and assembly costs as the separator. My bearing is most advantageously used in applications where the bearing carries a relatively high radial load at a relatively low speed.

I wish it to be understood that I do not desire to be limited to the exact details of construction shown and described, for obvious modifications will occur to a person skilled in the art.

I claim:

1. In an antifriction bearing subject to a load which produces a load zone and an unloaded zone in the bearing, the combination consisting of relatively rotatable inner and outer races,
   a complement of antifriction elements between said races, said complement of antifriction elements being less than a full complement, and
   resilient means fixedly mounted on one of said races frictionally engaging said antifriction elements and causing said antifriction elements to accelerate through the unloaded zone of the bearing to maintain a number of antifriction elements in the load zone of the bearing in excess of the number provided by an even spacing of the antifriction elements whereby the radial load capacity of the bearing is increased.

2. The combination as defined in claim 1 wherein said inner and outer races have deep grooved raceways and uninterrupted shoulders and wherein said races, said complement of antifriction elements and resilient means are in a unit-handled relationship.

3. The combination as defined in claim 2 wherein said antifriction elements are balls and wherein said complement of balls is the maximum number of balls which may be inserted into the deep grooved raceways by eccentrically locating the raceways.

4. The combination as defined in claim 1, 2, or 3 wherein said means includes a resilient annulus on each side of said antifriction elements and frictionally engaging them.

5. The combination as defined in claim 1, 2, or 3 wherein said resilient means comprises a resilient annulus on each side of said antifriction elements and frictionally engaging them, and wherein said one race is a driven race and wherein each of said annuli have a number of circumferentially spaced slots opening radially toward said other race.

References Cited

UNITED STATES PATENTS

| | | | |
|---|---|---|---|
| 864,859 | 9/1907 | Power | 308—199 |
| 1,556,997 | 10/1925 | Johnston | 308—189.1 |
| 1,895,540 | 1/1933 | Cohen | 308—193 |
| 2,893,791 | 7/1955 | Von Mehren | 308—199 |
| 3,037,827 | 6/1962 | Kupchick | 308—199 |

MARTIN P. SCHWADRON, Primary Examiner

F. SUSKO, Assistant Examiner